US012123068B2

(12) United States Patent
Kataoka et al.

(10) Patent No.: US 12,123,068 B2
(45) Date of Patent: Oct. 22, 2024

(54) GRAIN ORIENTED ELECTRICAL STEEL SHEET AND PRODUCING METHOD THEREOF

(71) Applicant: NIPPON STEEL CORPORATION, Tokyo (JP)

(72) Inventors: Takashi Kataoka, Tokyo (JP); Yoshiyuki Ushigami, Tokyo (JP); Shuichi Nakamura, Tokyo (JP); Hiroyasu Fujii, Tokyo (JP); Shunsuke Okumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 714 days.

(21) Appl. No.: 17/258,968

(22) PCT Filed: Jul. 13, 2018

(86) PCT No.: PCT/JP2018/026619
§ 371 (c)(1),
(2) Date: Jan. 8, 2021

(87) PCT Pub. No.: WO2020/012666
PCT Pub. Date: Jan. 16, 2020

(65) Prior Publication Data

US 2021/0123115 A1 Apr. 29, 2021

(51) Int. Cl.

| | |
|---|---|
| ***C21D 9/46*** | (2006.01) |
| ***C21D 6/00*** | (2006.01) |
| ***C21D 8/12*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/16*** | (2006.01) |
| ***C22C 38/18*** | (2006.01) |
| ***H01F 1/14*** | (2006.01) |

(52) U.S. Cl.
CPC ............... *C21D 9/46* (2013.01); *C21D 6/008* (2013.01); *C21D 8/1283* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/16* (2013.01); *C22C 38/18* (2013.01); *H01F 1/14* (2013.01); *C21D 2201/05* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 3,856,568 A | 12/1974 | Tanaka et al. |
| 4,875,947 A | 10/1989 | Nakayama et al. |
| 2002/0038678 A1 | 4/2002 | Ushigami et al. |
| 2003/0180553 A1 | 9/2003 | Shigesato et al. |
| 2005/0217761 A1 | 10/2005 | Ushigami et al. |
| 2011/0180187 A1 | 7/2011 | Ji et al. |
| 2015/0007908 A1 | 1/2015 | Watanabe et al. |
| 2019/0233914 A1 | 8/2019 | Hayakawa et al. |

FOREIGN PATENT DOCUMENTS

| | | |
|---|---|---|
| EP | 0 565 029 A1 | 10/1993 |
| EP | 3 822 391 A1 | 5/2021 |
| JP | 48-39338 A | 6/1973 |
| JP | 60-131976 A | 7/1985 |
| JP | 64-62417 A | 3/1989 |
| JP | 6-184762 A | 7/1994 |
| JP | 7-118750 A | 5/1995 |
| JP | 7-278668 A | 10/1995 |
| JP | 7-278669 A | 10/1995 |
| JP | 7-278670 A | 10/1995 |
| JP | 7-278833 A | 10/1995 |
| JP | 10-46252 A | 2/1998 |
| JP | 11-106827 A | 4/1999 |
| JP | 11-118750 A | 4/1999 |
| JP | 11-152517 A | 6/1999 |
| JP | 2002-60843 A | 2/2002 |

(Continued)

OTHER PUBLICATIONS

"Test methods for electrical steel strip and sheet—Part 1: Methods of measurement of the magnetic properties of electrical steel strip and sheet by means of an Epstein frame", Jis C 2550-1, 2011, total 10 pages.
Shibanuma et al., "Development of Numerical Model to Predict Cleavage Fracture Toughness of Ferrite Steel", Tetsu-to-Hagané, 2013, vol. 99, No. 1, pp. 40-49.
Gulyaev, "Metallurgy," 1986, pp. 88-89 (total 2 pages).
Kuznetsov, "Big Explanatory Dictionary of the Russian Language," St. Petersburg, Russia, 1998. p. 1249 (total 2 pages).

(Continued)

*Primary Examiner* — Anthony M Liang

(74) *Attorney, Agent, or Firm* — Birch, Stewart, Kolasch & Birch, LLP

(57) ABSTRACT

A grain oriented electrical steel sheet includes: by mass %, 0.010% or less of C; 2.50 to 4.00% of Si; 0.010% or less of acid soluble Al; 0.012% or less of N; 1.00% or less of Mn; 0.020% or less of S; and a balance comprising Fe and impurities, and has a tension-insulation coating at steel sheet surface and a $SiO_2$ intermediate oxide film layer with an average thickness of 1.0 nm to 1.0 μm at an interface between the tension-insulation coating and the steel sheet surface. In the grain oriented electrical steel, when a surface of the intermediate oxide film layer is analyzed by an infrared reflection spectroscopy, a peak intensity $I_A$ at 1250 $cm^{-1}$ and a peak intensity $I_B$ at 1200 $cm^{-1}$ satisfy $I_B/I_A \geq 0.010$.

16 Claims, 1 Drawing Sheet

(56) References Cited

FOREIGN PATENT DOCUMENTS

| | | | |
|---|---|---|---|
| JP | 2002-173715 | A | 6/2002 |
| JP | 2002-348613 | A | 12/2002 |
| JP | 2002-348643 | A | 12/2002 |
| JP | 2002-363646 | A | 12/2002 |
| JP | 2003-3213 | A | 1/2003 |
| JP | 2003-41320 | A | 2/2003 |
| JP | 2003-55717 | A | 2/2003 |
| JP | 2003-166019 | A | 8/2003 |
| JP | 2003-247021 | A | 9/2003 |
| JP | 2003-247024 | A | 9/2003 |
| JP | 2003-268450 | A | 9/2003 |
| JP | 2003-268541 | A | 9/2003 |
| JP | 2008-1980 | A | 1/2008 |
| JP | 2011-518253 | A | 6/2011 |
| WO | WO 2018/056379 | A1 | 3/2018 |

OTHER PUBLICATIONS

Russian Office Action and Search Report, dated Jul. 2, 2021, for Russian Application No. 2020143604, with English translations.

Sorokin, "Interrnet Engineering," Steels and Alloys, 2001, p. 10 (total 2 pages).

U.S. Office Action for U.S. Appl. No. 17/259,119, dated Nov. 16, 2022.

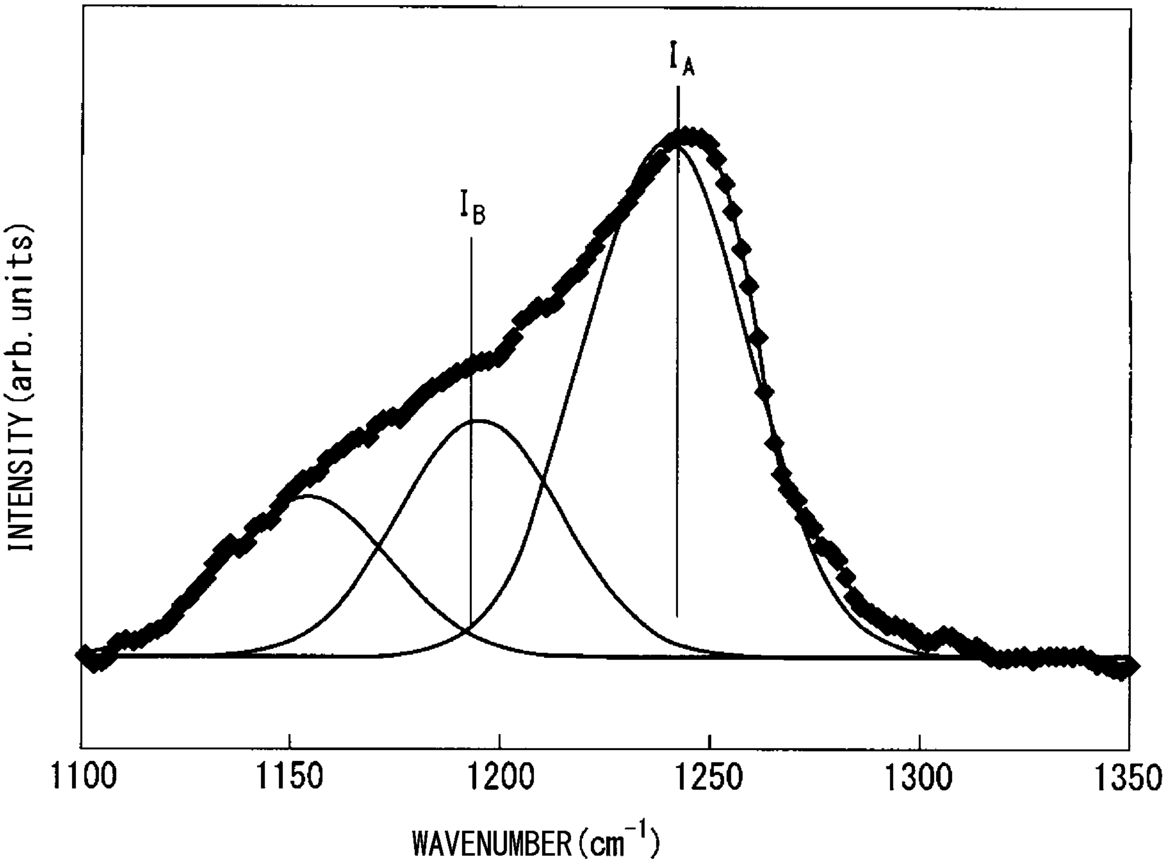
I_A
I_B
INTENSITY (arb. units)
1100
1150
1200
1250
1300
1350
WAVENUMBER (cm-1)

GRAIN ORIENTED ELECTRICAL STEEL SHEET AND PRODUCING METHOD THEREOF

TECHNICAL FIELD

The present invention relates to a grain oriented electrical steel sheet which is used as an iron core material for a transformer, and a method for producing thereof. In particular, the present invention relates to the grain oriented electrical steel sheet excellent in the adhesion of a tension-insulation coating, and a method for producing thereof.

BACKGROUND ART

A grain oriented electrical steel sheet includes a silicon steel sheet which is composed of grains oriented to {110}<001> (hereinafter, Goss orientation) and which includes 7 mass % or less of Si. The grain oriented electrical steel sheet has been mainly applied to iron core materials of transformer. The highly alignment in Goss orientation in the grain oriented electrical steel sheet is controlled by a grain growth phenomenon called secondary recrystallization.

The grain oriented electrical steel sheet is required to be high magnetic flux density (represented by B8 value) and low iron loss (represented by W17/50 value) as magnetic characteristics. Recently, from the viewpoint of energy saving, it is further required to reduce a power loss, specifically to reduce the iron loss.

In the grain oriented electrical steel sheet, magnetic domains change with domain wall motion under an alternating magnetic field. When the magnetic walls move easily, it is effective in reducing the iron loss. However, in the case, there are some magnetic domains which do not move when observing the movement of the magnetic domains.

In order to further reduce the iron loss of the grain oriented electrical steel sheet, it is important to avoid a pinning effect derived from unevenness of an interface of forsterite film ($Mg_2SiO_4$) (hereinafter, it may be referred to as "glass film") on the steel sheet, which interferes with the movement of the magnetic domains. In order to avoid the pinning effect, it is effective not to form the glass film on the steel sheet, which interferes with the movement of the magnetic domains.

As techniques to avoid the above pinning effect, for instance, Patent Documents 1 to 21 disclose that Fe based oxides ($Fe_2SiO_4$, FeO, or the like) are made not to form in an oxide layer when being decarburized by controlling a dew point for decarburization annealing, and that a surface is made to smoothen after final annealing by utilizing an agent such as alumina which does not react with silica as an annealing separator.

In a case where the grain oriented electrical steel sheet is used as the iron core material for the transformer, since it is needed to secure insulation for the steel sheet, the insulation coating applying tension is formed on the surface of the steel sheet. For instance, Patent Document 6 discloses a technique such that the insulation coating is formed by applying solution mainly containing colloidal silica and phosphate onto the surface of the steel sheet and by baking it, and the technique is effective in reducing the iron loss in addition to securing the insulation because the tension is effectively applied to the steel sheet.

As described above, the insulating coating mainly containing the phosphate is formed on the glass film which is formed in the final annealing, which is a conventional method for producing the grain oriented silicon steel sheet.

In a case where the insulating coating is formed on the glass film, coating adhesion is sufficiently obtained. On the other hand, in a case where the glass film is removed or where the glass film is not consciously formed in the final annealing, the coating adhesion is insufficient.

In a case where the glass film is removed, the predetermined coating adhesion needs to be secured only by the tension-insulation coating formed by applying the solution. In the case, it is necessary to thicken the tension-insulation coating, and thus, the additional coating adhesion is to be required.

As described above, in the conventional method for forming the coating, it has been difficult to secure the coating tension enough to obtain an effect derived from the surface smoothening, and also difficult to secure the film adhesion. Thus, in the conventional method, it has been difficult to sufficiently reduce the iron loss. Against the above situation, for instance, Patent Documents 22 to 25 disclose a method for forming an oxide film on the surface of the grain oriented silicon steel sheet after conducting the final annealing and before forming the tension-insulation coating, as a technique to secure the coating adhesion for the tension-insulation coating.

For instance, Patent Document 23 discloses a technique such that the grain oriented silicon steel sheet in which the surface is smoothened or is prepared to be close to smooth is used, the above steel sheet after the final annealing is annealed in predetermined atmosphere at each temperature, the oxide film is formed on the surface of the steel sheet as an externally oxidized layer by the above annealing, and the coating adhesion between the tension-insulation coating and the steel sheet is secured by the above oxide film.

Patent Document 24 discloses a technique such that, in a case where the tension-insulation coating is crystalline, the grain oriented silicon steel sheet without an inorganic mineral material film is used, a base coating of amorphous oxide is formed on the surface of the steel sheet after the final annealing, and thereby, oxidation of the steel sheet, specifically deterioration of mirror surface is suppressed when the crystalline tension-insulation coating is formed.

Patent Document 25 discloses a technique which is improved on the basis of that disclosed in Patent Document 8. In Patent Document 25, a film structure of a metal oxide film including Al, Mn, Ti, Cr, or Si is controlled between the tension-insulation coating and the steel sheet, and thereby, the coating adhesion of the insulation coating is improved. However, although stress sensitivity notably affects an adhesion of an interface between the metal oxide film and the steel sheet, Patent Document 25 does not consider the above situation. Thus, the technique disclosed in Patent Document 25 is insufficient for improving the coating adhesion.

RELATED ART DOCUMENTS

Patent Documents

[Patent Document 1] Japanese Unexamined Patent Application, First Publication No. S64-062417

[Patent Document 2] Japanese Unexamined Patent Application, First Publication No. H07-118750

[Patent Document 3] Japanese Unexamined Patent Application, First Publication No. H07-278668

[Patent Document 4] Japanese Unexamined Patent Application, First Publication No. H07-278669

[Patent Document 5] Japanese Unexamined Patent Application, First Publication No. H07-278670

[Patent Document 6] Japanese Unexamined Patent Application, First Publication No. H10-046252

[Patent Document 7] Japanese Unexamined Patent Application, First Publication No. H11-106827

[Patent Document 8] Japanese Unexamined Patent Application, First Publication No. H11-152517

[Patent Document 9] Japanese Unexamined Patent Application, First Publication No. 2002-060843

[Patent Document 10] Japanese Unexamined Patent Application, First Publication No. 2002-173715

[Patent Document 11] Japanese Unexamined Patent Application, First Publication No. 2002-348613

[Patent Document 12] Japanese Unexamined Patent Application, First Publication No. 2002-363646

[Patent Document 13] Japanese Unexamined Patent Application, First Publication No. 2003-055717

[Patent Document 14] Japanese Unexamined Patent Application, First Publication No. 2003-268541

[Patent Document 15] Japanese Unexamined Patent Application, First Publication No. 2003-003213

[Patent Document 16] Japanese Unexamined Patent Application, First Publication No. 2003-041320

[Patent Document 17] Japanese Unexamined Patent Application, First Publication No. 2003-247021

[Patent Document 18] Japanese Unexamined Patent Application, First Publication No. 2003-247024

[Patent Document 19] Japanese Unexamined Patent Application, First Publication No. 2008-001980

[Patent Document 20] Published Japanese Translation No. 2011-518253 of the PCT International Publication

[Patent Document 21] Japanese Unexamined Patent Application, First Publication No. S48-039338

[Patent Document 22] Japanese Unexamined Patent Application, First Publication No. S60-131976

[Patent Document 23] Japanese Unexamined Patent Application, First Publication No. H06-184762

[Patent Document 24] Japanese Unexamined Patent Application, First Publication No. H07-278833

[Patent Document 25] Japanese Unexamined Patent Application, First Publication No. 2002-348643

Non-Patent Document

[Non-Patent Document 1] Tetsu-to-Hagane, Vol. 99 (2013), 40.

SUMMARY OF INVENTION

Technical Problem to be Solved

In the grain oriented silicon steel sheet on which the tension-insulation coating is formed, in a case where the tension-insulation coating is formed on the glass film (forsterite film), the coating adhesion of the tension-insulation coating is sufficient. On the other hand, in a case where the tension-insulation coating is formed after the glass film is purposely suppressed to be formed, after the glass film is removed by grinding, pickling, or the like, or after the surface of the steel sheet is smoothened to be a mirror like surface, the coating adhesion of the tension-insulation coating is insufficient, and thus, it is difficult to simultaneously satisfy both the coating adhesion and magnetic stability.

Therefore, an object of the present invention is to form the tension-insulation coating with excellent coating adhesion and without deteriorating the magnetic characteristics and its stability on the surface of the grain oriented electrical steel sheet after the final annealing where the glass film is purposely suppressed to be formed, the glass film is removed by grinding, pickling, or the like, or the surface of the steel sheet is smoothened to be a mirror like surface. That is, the object of the present invention is to provide the grain oriented electrical steel sheet which is capable of solving the above technical problem, and to provide a producing method thereof.

Solution to Problem

In order to solve the above technical problem, the present inventors have made a thorough investigation to improve the coating adhesion for the tension-insulation coating, focusing on the effects of additive elements. As a result, it is found that, by controlling thermal history and oxidation degree in a process of forming an oxide film (hereinafter, it may be referred to as "intermediate oxide film layer" or "$SiO_2$ intermediate oxide film layer") on the surface of the grain oriented electrical steel sheet after the final annealing before forming the tension-insulation coating, it is possible to remarkably improve the coating adhesion for the tension-insulation coating.

Furthermore, the present inventors have made a thorough investigation in regard to compositions of the intermediate oxide film layer which seems to considerably influence the coating adhesion. As a result, it is found that oxide of the intermediate oxide film layer is Si-oxide ($SiO_2$) and that the coating adhesion is improved when elements such as Mn are solid-soluted in the $SiO_2$ intermediate oxide film layer.

It is considered that the atoms which are solid-soluted in the $SiO_2$ intermediate oxide film layer improve lattice matching between the $SiO_2$ intermediate oxide film layer and the steel sheet, and thereby, the adhesion of the $SiO_2$ intermediate oxide film layer is improved.

The present invention is made on the basis of the above-described findings. An aspect of the present invention employs the following.

(1) A grain oriented electrical steel sheet according to an aspect of the present invention includes:

a base steel sheet;

an intermediate oxide film layer which is arranged on the base steel sheet, includes $SiO_2$, and has an average thickness of 1.0 nm to 1.0 μm; and a tension-insulation coating which is arranged on the intermediate oxide film layer, wherein the base steel sheet includes: as a chemical composition, by mass %, 0.010% or less of C; 2.50 to 4.00% of Si; 0.010% or less of acid soluble Al; 0.012% or less of N; 1.00% or less of Mn; 0.020% or less of S; and a balance comprising Fe and impurities, and wherein, when a surface of the $SiO_2$ intermediate oxide film layer is analyzed by an infrared reflection spectroscopy, a peak intensity $I_A$ at 1250 $cm^{-1}$ and a peak intensity $I_B$ at 1200 $cm^{-1}$ satisfy a following formula (1), $$I_B/I_A \geq 0.010 \quad (1).$$

(2) In the grain oriented electrical steel sheet according to (1), the base steel sheet may further include, as the chemical composition, by mass %, 0.001 to 0.010% of B.

(3) In the grain oriented electrical steel sheet according to (1) or (2), the base steel sheet may further include: as the chemical composition, by mass %, at least one selected from 0.01 to 0.20% of Sn; 0.01 to 0.50% of Cr; and 0.01 to 0.50% of Cu.

(4) In the grain oriented electrical steel sheet according to any one of (1) to (3), a time differential curve $f_M(t)$ of a glow discharge optical emission spectrum of an element M (M: Mn, Al, B) in a surface of the $SiO_2$ intermediate oxide film layer may satisfy a following formula (2).

[Formula 1]

$$\int_{Ts}^{Tp} f_M(t)dt > 0 \quad (2)$$

Tp: a time t (second) corresponding to a local minimum value of a second-order time differential curve of a glow discharge optical emission spectrum of Si.

Ts: a time t (second) corresponding to an analysis starting point of a glow discharge optical emission spectrum of Si.

(5) A method for producing a grain oriented electrical steel sheet according to an aspect of the present invention is for producing the grain oriented electrical steel sheet according to any one of (1) to (4), and the method may include: an oxide film layer forming process of forming an intermediate oxide film layer on a steel sheet, wherein, in the oxide film layer forming process, an annealing is conducted under conditions such that an annealing temperature T1 is 600 to 1200° C., an annealing time is 5 to 200 seconds, an oxidation degree $P_{H2O}/P_{H2}$ is 0.15 or less, and an average heating rate HR1 in a temperature range of 100° C. to 600° C. is 10 to 200° C./second, and after the annealing, an average cooling rate CR1 in a temperature range of T2° C. to T1° C. is 50° C./second or less, and an average cooling rate CR2 in a temperature range of 100° C. or more and less than T2° C. is slower than CR1, when T2 is a temperature expressed in T1° C.-100° C.

Effects of Invention

According to the above aspects of the present invention, it is possible to form the tension-insulation coating with excellent coating adhesion and without deteriorating the magnetic characteristics and its stability on the surface of the grain oriented electrical steel sheet after the final annealing where the glass film is purposely suppressed to be formed, the glass film is removed by grinding, pickling, or the like, or the surface of the steel sheet is smoothened to be the mirror like surface.

BRIEF DESCRIPTION OF DRAWINGS

FIG. 1 is an illustration showing a spectrum of an infrared reflection analysis of a surface of a $SiO_2$ intermediate oxide film layer.

DETAILED DESCRIPTION OF PREFERRED EMBODIMENTS

A grain oriented electrical steel sheet according to an embodiment (hereinafter, it may be referred to as "the present electrical steel sheet") includes: a base steel sheet; an intermediate oxide film layer which is arranged on the base steel sheet, includes $SiO_2$, and has an average thickness of 1.0 nm to 1.0 μm; and a tension-insulation coating which is arranged on the intermediate oxide film layer.

The base steel sheet includes: as a chemical composition, by mass %, 0.010% or less of C;

2.50 to 4.00% of Si;

0.01% or less of acid soluble Al;

0.012% or less of N;

1.00% or less of Mn;

0.02% or less of S; and a balance comprising Fe and impurities, and when a surface of the $SiO_2$ intermediate oxide film layer is analyzed by an infrared reflection spectroscopy, a peak intensity $I_A$ at 1250 $cm^{-1}$ and a peak intensity $I_B$ at 1200 $cm^{-1}$ satisfy a following formula (1).

$$I_B/I_A \geq 0.010 \quad (1)$$

In addition, in the present electrical steel sheet, the base steel sheet may further includes, as the chemical composition, by mass %, (a) 0.001 to 0.010% of B and/or (b) at least one selected from 0.01 to 0.20% of Sn; 0.01 to 0.50% of Cr; and 0.01 to 0.50% of Cu.

In addition, in the present electrical steel sheet, a time differential curve $f_M(t)$ of a glow discharge optical emission spectrum of an element M (M: Mn, Al, B) in a surface of the $SiO_2$ intermediate oxide film layer may satisfy a following formula (2).

[Formula 2]

$$\int_{Ts}^{Tp} f_M(t)dt > 0 \quad (2)$$

Tp: a time t (second) corresponding to a local minimum value of a second-order time differential curve of a glow discharge optical emission spectrum of Si.

Ts: a time t (second) corresponding to an analysis starting point of a glow discharge optical emission spectrum of Si.

A method for producing the grain oriented electrical steel sheet according to the embodiment (hereinafter, it may be referred to as "the present producing method") includes an oxide film layer forming process of forming an intermediate oxide film layer on a steel sheet, wherein, in the oxide film layer forming process, an annealing is conducted under conditions such that an annealing temperature T1 is 600 to 1200° C., an annealing time is 5 to 200 seconds, an oxidation degree $P_{H2O}/P_{H2}$ is 0.15 or less, and an average heating rate HR1 in a temperature range of 100° C. to 600° C. is 10 to 200° C./second, and after the annealing, an average cooling rate CR1 in a temperature range of T2° C. to T1° C. is 50° C./second or less, and an average cooling rate CR2 in a temperature range of 100° C. or more and less than T2° C. is slower than CR1, when T2 is a temperature expressed in T1° C.-100° C.

The present electrical steel sheet and the present producing method are described.

(Base Steel Sheet)

<Chemical Composition>

Limitation reasons of the chemical composition of the base steel sheet are explained. Hereinafter, "%" of the chemical composition represents "mass %".

0.010% or Less of C

When the C content is more than 0.010%, C suppresses formation of a concentrated layer of Al or other elements in the interface between the $SiO_2$ intermediate oxide film layer and the steel sheet.

Thus, the C content is 0.010% or less. The C content is preferably 0.008% or less for improving the iron loss characteristics.

Although a lower limit thereof includes 0%, a detection limit of the C content is approximately 0.0001%. Thus, the lower limit is substantially 0.0001% as practical steel sheet.

2.50 to 4.00% of Si

When the Si content is less than 2.50%, the secondary recrystallization does not proceed sufficiently, and excellent magnetic flux density and iron loss are not obtained. Thus, the Si content is 2.50% or more. The Si content is preferably 2.75% or more, and more preferably 3.00% or more.

On the other hand, when the Si content is more than 4.0%, the steel sheet becomes brittle, and thereby, passability during the production significantly deteriorates. Thus, the Si content is 4.00% or less. The Si content is preferably 3.75% or less, and more preferably 3.50% or less.

0.010% or Less of Acid Soluble Al

As a slab composition, 0.07% or less of the acid-soluble Al is included in the slab for the passability during cold rolling. In the case, an upper limit of the acid-soluble Al content is 0.07%. In practice, Al is eliminated from the steel sheet during secondary recrystallization annealing. As a result, the acid-soluble Al included in the base steel sheet may be 0.010% or less. Although the passability does not matter when the acid-soluble Al content is 0.07% or less, the acid-soluble Al content in the base steel sheet is preferably as small as possible for the iron loss characteristics, and is preferably 0.006% or less.

Although a lower limit thereof includes 0%, a detection limit thereof is approximately 0.0001% in common with C. Thus, the lower limit is substantially 0.0001% as practical steel sheet.

0.012% or Less of N

When the N content is more than 0.012%, blisters (voids) may be formed in the steel sheet during the cold rolling, strength of the steel sheet may increase, and the passability during the production may deteriorate. Thus, the N content may be 0.012% or less. The N content is preferably 0.010% or less, and more preferably 0.009% or less.

Although a lower limit thereof includes 0%, a detection limit of the N content is approximately 0.0001%. Thus, the lower limit is substantially 0.0001% as practical steel sheet.

1.00% or Less of Mn

When the Mn content is more than 1.00%, phase transformation occurs in the steel during the secondary recrystallization annealing, the secondary recrystallization does not sufficiently proceed, and excellent magnetic flux density and iron loss are not obtained. Thus, the Mn content is 1.00% or less. The Mn content is preferably 0.50% or less, and more preferably 0.20% or less.

MnS may be utilized as an inhibitor during the secondary recrystallization. However, in a case where AlN is utilized as the inhibitor, MnS is not necessary. Thus, a lower limit of the Mn content includes 0%. When MnS is utilized as the inhibitor, the Mn content may be 0.02% or more. The Mn content is preferably 0.05% or more, and more preferably 0.07% or more.

0.020% or Less of S

When the S content is more than 0.020%, in common with C, S suppresses the formation of the concentrated layer of Al or other elements in the interface between the $SiO_2$ intermediate oxide film layer and the steel sheet. Thus, the S content is 0.020% or less. The S content is preferably 0.010% or less.

Although a lower limit thereof includes 0%, a detection limit of the S content is approximately 0.0001%. Thus, the lower limit is substantially 0.0001% as practical steel sheet.

In addition, Se or Sb may be substituted for a part of S. In the case, a converted value by Seq=S+0.406Se or Seq=S+0.406Sb may be used.

In the present electrical steel sheet, in addition to the above elements, (a) 0.001 to 0.010% of B and/or (b) at least one selected from 0.01 to 0.20% of Sn; 0.01 to 0.50% of Cr; and 0.01 to 0.50% of Cu may be included in order to improve the characteristics of the present electrical steel sheet.

0.001 to 0.010% of B

In common with Cr and Cu, B is an element which is concentrated in the interface between the $SiO_2$ intermediate oxide film layer and the steel sheet (the inventors have conformed by using GDS), and thus, which contributes to the improvement of the coating adhesion. When the B content is less than 0.001%, the improvement effect of the coating adhesion is not sufficiently obtained. Thus, the B content is 0.001% or more. The B content is preferably 0.002% or more, and more preferably 0.003% or more.

On the other hand, when the B content is more than 0.010%, the strength of the steel sheet increases, and the passability during the cold rolling deteriorates. Thus, the B content is 0.010% or less. The B content is preferably 0.008% or less, and more preferably 0.006% or less.

0.01 to 0.20% of Sn

Sn is an element which is not concentrated in the interface between the $SiO_2$ intermediate oxide film layer and the steel sheet, but which contributes to the improvement of the coating adhesion. A mechanism for improving the coating adhesion by Sn is not clear. However, as a result of investigating the surface smoothness of the steel sheet after the secondary recrystallization, it is found that the surface of the steel sheet is smoothened. Thus, it seems that Sn makes the surface of the steel sheet smoothen by reducing the unevenness and that contributes to forming the interface with few unevenness defects between the $SiO_2$ intermediate oxide film layer and the steel sheet.

When the Sn content is less than 0.01%, the smoothing effect of the surface of the steel sheet is not sufficiently obtained. Thus, the Sn content is 0.01% or more. The Sn content is preferably 0.02% or more, and more preferably 0.03% or more.

On the other hand, when the Sn content is more than 0.20%, the secondary recrystallization becomes unstable, and thereby, the magnetic characteristics deteriorate. Thus, the Sn content is 0.20% or less. The Sn content is preferably 0.15% or less, and more preferably 0.10% or less.

0.01 to 0.50% of Cr

In common with B and Cu, Cr is an element which is concentrated in the interface between the $SiO_2$ intermediate oxide film layer and the steel sheet, and thus, which contributes to the improvement of the coating adhesion. When the Cr content is less than 0.01%, the improvement effect of the coating adhesion is not sufficiently obtained. Thus, the Cr content is 0.01% or more. The Cr content is preferably 0.03% or more, and more preferably 0.05% or more.

On the other hand, when the Cr content is more than 0.50%, Cr may bond to Si and 0, and thereby, the formation of the $SiO_2$ intermediate oxide film layer may be suppressed. Thus, the Cr content is 0.50% or less. The Cr content is preferably 0.30% or less, and more preferably 0.20% or less.

0.01 to 0.50% of Cu

In common with B and Cr, Cu is an element which is concentrated in the interface between the $SiO_2$ intermediate oxide film layer and the steel sheet, and thus, which contributes to the improvement of the coating adhesion. When the Cu content is less than 0.01%, the improvement effect of the coating adhesion is not sufficiently obtained. Thus, the Cu content is 0.01% or more. The Cu content is preferably 0.03% or more, and more preferably 0.05% or more.

On the other hand, when the Cu content is more than 0.50%, the steel sheet becomes brittle during hot rolling. Thus, the Cu content is 0.50% or less. The Cu content is preferably 0.20% or less, and more preferably 0.10% or less.

In the base steel sheet, the balance of the chemical composition is Fe and impurities (unavoidable impurities). In order to improve the magnetization characteristics, the characteristics required for structural materials such as strength, corrosion resistance, and fatigue characteristics, the castability, the passability, and the productivity when using scraps and the like, the base steel sheet may include at least one selected from the group consisting of Mo, W, In, Bi, Sb, Ag, Te, Ce, V, Co, Ni, Se, Ca, Re, Os, Nb, Zr, Hf, Ta, Y, La, and the like. The total amount thereof may be 5.00% or less. The total amount thereof is preferably 3.00% or less, and more preferably 1.00% or less.

(Intermediate Oxide Film Layer)

Next, the intermediate oxide film layer (hereinafter, it may be referred to as "$SiO_2$ intermediate oxide film layer") which importantly functions for improving the coating adhesion is explained. The present electrical steel sheet is produced in such a way that the glass film is purposely suppressed to be formed or that the glass film is removed by grinding, pickling, or the like. The $SiO_2$ intermediate oxide film layer with predetermined thickness is arranged between the tension-insulation coating and the steel sheet in order to sufficiently secure the coating adhesion for the tension-insulation coating.

Average thickness of $SiO_2$ intermediate oxide film layer: 1.0 nm or more and 1.0 μm or less When the average thickness of the $SiO_2$ intermediate oxide film layer is less than 1.0 nm, the coating adhesion of the tension-insulation coating is not sufficiently secured. Thus, the average thickness of the $SiO_2$ intermediate oxide film layer is 1.0 nm or more. The average thickness of the $SiO_2$ intermediate oxide film layer is preferably 5.0 nm or more, and more preferably 9.0 nm or more.

On the other hand, when the average thickness of the $SiO_2$ intermediate oxide film layer is more than 1.0 μm, cracks which become fracture origin occur inside the $SiO_2$ intermediate oxide film layer, and thereby, the coating adhesion deteriorates. Thus, the average thickness of the $SiO_2$ intermediate oxide film layer is 1.0 μm or less. The average thickness of the $SiO_2$ intermediate oxide film layer is preferably 0.7 μm (=700 nm) or less, and more preferably 0.4 μm (=400 nm) or less.

The thickness of the $SiO_2$ intermediate oxide film layer is measured on a cross section of sample by a transmission electron microscope (TEM) or a scanning electron microscope (SEM).

It is possible to confirm whether the oxide constituting the $SiO_2$ intermediate oxide film layer includes "$SiO_2$" or not by elemental analysis using energy dispersive X-ray spectroscopy (EDS) attached to TEM or SEM.

Specifically, it is possible to confirm the existence of "$SiO_2$" by detecting a Si Kα ray at an energy position of 1.8±0.3 key and simultaneously detecting an O Kα ray at an energy position of 0.5±0.3 key in a horizontal axis in the EDS spectrum in the $SiO_2$ intermediate oxide film layer. In addition to the Kα ray, the elemental identification can be conducted by using an Lα ray, an Kγ ray, or the like.

Herein, the EDS spectrum of Si may include a spectrum originated from Si included in the steel sheet. Thus, to be exact, by analyzing the surface of the steel sheet using an electron probe micro analyzer (EPMA), it is determined whether Si is originated from the steel sheet or the $SiO_2$ intermediate oxide film layer.

In addition, it is possible to confirm whether a compound constituting the $SiO_2$ intermediate oxide film layer is "$SiO_2$" or not by the infrared reflection analysis of the surface of the $SiO_2$ intermediate oxide film layer and by confirming the existence of the peak originated from $SiO_2$ at a wavenumber of 1250 $cm^{-1}$±20 $cm^{-1}$.

Herein, the infrared reflection spectroscopy is a method for selectively detecting compounds on an outermost surface of a sample. Thus, the analysis is conducted for a sample (a) without the tension-insulation coating. For a sample (b) with the tension-insulation coating thereon, the analysis is conducted after completely removing the tension-insulation coating by alkaline cleaning.

Herein, the Infrared spectroscopy (IR) includes a reflection method and an absorption method. In the absorption method, the information derived from outermost surface of the sample and the information derived from inside of the steel sheet are superimposed. Thus, in order to identify the compound constituting the $SiO_2$ intermediate oxide film layer, the reflection method is preferable. Moreover, in the absorption method, the wavenumber related to the $SiO_2$ intermediate oxide film layer is not 1250 $cm^{-1}$, and the peak thereof shifts depending on formation conditions of $SiO_2$.

$I_B/I_A$: 0.010 or more

A ratio $I_B/I_A$ of the peak intensity $I_B$ at 1200 $cm^{-1}$ to the peak intensity $I_A$ at 1250 $cm^{-1}$ is 0.010 or more.

By controlling the thickness of the $SiO_2$ intermediate oxide film layer to be 1.0 nm to 1.0 μm, the coating adhesion of the tension-insulation coating is secured. However, in a case where lattice defects exist at the interface between the $SiO_2$ intermediate oxide film layer and the steel sheet, the coating adhesion may deteriorate.

The lattice defects at the interface are induced due to a difference between a lattice constant of the $SiO_2$ intermediate oxide film layer and a lattice constant of the steel sheet. Mn is solid-soluted in the $SiO_2$ intermediate oxide film layer, and thereby, it is possible to further improve the coating adhesion of the tension-insulation coating. A mechanism for improving the coating adhesion seems to be as follows.

Since a dangling bond (wave function) originated from Si formed on the surface of the $SiO_2$ intermediate oxide film layer, the surface of the $SiO_2$ intermediate oxide film layer has an electrical attraction, that is, an adsorption force. Thus, the $SiO_2$ intermediate oxide film layer and the steel sheet adhere. On the other hand, the lattice matching is inconsistent at the interface between the $SiO_2$ intermediate oxide film layer and the steel sheet, and the lattice defects are induced at the interface between the $SiO_2$ intermediate oxide film layer and the steel sheet.

When Mn is solid-soluted in the $SiO_2$ intermediate oxide film layer, lattice periodicity of $SiO_2$ changes at the interface between the $SiO_2$ intermediate oxide film layer and the steel sheet, and the lattice matching increases at the interface between the $SiO_2$ intermediate oxide film layer and the steel sheet. As a result, the lattice defects derived from lattice mismatching decrease, and finally, the coating adhesion of the tension-insulation coating is improved.

The solid-solution state or the concentration state of Mn in the $SiO_2$ intermediate oxide film layer contributes to the improvement of the coating adhesion of the tension-insulation coating as explained in the above mechanism, and it is possible to confirm the solid-solution state or the concentration state by the infrared reflection spectroscopy.

In the present electrical steel sheet, the peak originated from ordinary $SiO_2$ exists at the wavenumber of 1250 $cm^{-1}$, and the peak originated from $SiO_2$ in which the lattice constant is changed (hereinafter, it may be referred to as "$Si(Mn)O_X$") exists at the wavenumber of 1200 $cm^{-1}$ and 1150 $cm^{-1}$. An abundance of $Si(Mn)O_X$ in which the lattice constant is changed influences the peak intensity at the wavenumber of 1200 $cm^{-1}$ or 1150 $cm^{-1}$. Herein, the wavenumber which corresponds to a horizontal axis of the infrared reflection spectroscopy may shift within a range of ±20 $cm^{-1}$, depending on measurement conditions and fitting method.

FIG. 1 is an illustration showing a spectrum of the infrared reflection analysis of the surface of the $SiO_2$ intermediate oxide film layer. The spectrum as shown in FIG. 1 is an instance of deconvolution of the $SiO_2$ peak assuming a Gauss distribution. When conducting the deconvolution, a distribution function may be at least one selected from Voigt, Gaussian, and Lorentz.

Herein, the peak intensity may be defined as a peak height after subtracting background using analysis software, and may be defined as an integrated intensity of the peak.

When the peak originated from $Si(Mn)O_X$ is unclear, it is possible to obtain the peak intensity by the peak deconvolution using fitting.

The present inventors have found that, when the peak intensity $I_A$ originated from $SiO_2$ at the wavenumber of 1250 $cm^{-1}$ and the peak intensity $I_B$ originated from $Si(Mn)O_X$ at the wavenumber of 1200 $cm^{-1}$ satisfy the following formula (1), it is possible to obtain excellent coating adhesion.

$$I_B/I_A \geqq 0.010 \quad (1)$$

Although an upper limit of $I_B/I_A$ is not particularly limited, the amount of solid-soluted Mn or concentrated Mn has a limit. When considering the limit, the upper limit of $I_B/I_A$ may be approximately 10. In order to reliably obtain excellent coating adhesion, $I_B/I_A$ is preferably 0.010 to 5, and more preferably 0.010 to 1.

In a case where the element M (M: Mn, Al, B) is solid-soluted in the $SiO_2$ intermediate oxide film layer, it is possible to confirm the solid-solution state of the element M by the glow discharge optical emission spectrum (GDS). In the case, relation between a depth position of the $SiO_2$ intermediate oxide film layer and a depth position of the element M is important.

The depth position of the $SiO_2$ intermediate oxide film layer can be analyzed by GDS spectrum originated from Si (hereinafter, it may be referred to as "$F_{Si}(t)$"). The explanation is as follows.

The GDS spectrum may be smoothed using software for analyzing a peak or the like. Moreover, in order to improve accuracy of peak analysis, a time interval Δt of measurement is preferably as small as possible, and preferably 0.05 seconds or less. Hereinafter, t expresses a time (second) corresponding to a depth position of sample.

The above t is a variable when the GDS spectrum is a function of time. In a case where the $SiO_2$ intermediate oxide film layer exists on a surface of a sample taken from the steel sheet, it is possible to discriminate (A) a rising position of peak from background, (B) a vertex position of peak, and (C) a terminating position of peak to background, in a region corresponding to the surface of the sample in the GDS spectrum originated from Si.

Hereinafter, Ts expresses time t corresponding to the rising position of peak, Tp expresses time t corresponding to the vertex position of peak, and Tf expresses time t corresponding to the terminating position of peak. The $SiO_2$ intermediate oxide film layer may be the outermost surface of the measured sample. Thus, t corresponding to an analysis starting point of the GDS spectrum may be the rising position of peak, and the analysis starting point of the GDS spectrum may be defined as Ts. Moreover, the peak may be symmetrical following normal distribution, and may be defined as Tf=2Tp−Ts.

Since the time interval Δt for measuring the GDS spectrum may be as small as 0.05 seconds or less, Ts may be approximated to ≈0, and thus, it may be approximated to Tf=2×Tp. The method for determining Tp is explained below.

Tp corresponds to the vertex position of peak in the GDS spectrum originated from Si. In order to determine the vertex position of peak, $F_{Si}(t)$ may be second-order differentiated with respect to the time, t corresponding to a local minimum value of a second-order differential curve may be found (see "$d^2F(t)/dT^2$" in FIG. 1). Herein, the local minimum value needs to be found in a range of t=0 second or more and Δt×100 seconds or less. The above reason is because the $SiO_2$ intermediate oxide film layer exists only in the surface of the sample, and does not exist inside the steel sheet, so that t becomes a relatively small value.

Moreover, when $f_{Si}(t)$ is constantly 0 or more in a range such that t is Ts to Tp in a curve $f_{Si}(t)$ (=$dF_{Si}(t)/dt$) (see "dF(t)/dt" in FIG. 1) where $F_{Si}(t)$ is first-order differentiated with respect to the time, it is more decisive that Tp corresponds to the vertex position of peak.

Herein, the differential curve may be obtained by calculating a derivative or by being approximated using $f(t_n)=[F(t_n)-F(t_{n-1})]/[t_n-t_{n-1}]$ as difference calculus. The above $t_n$ expresses n-th measurement point (time), and $F(t_n)$ expresses spectral intensity thereat.

When the peak originated from Si is unclear, the analysis can be performed using GDS spectrum originated from Fe (hereinafter, it may be referred to as "$F_{Fe}(t)$"). In the case, when t corresponding to a local maximum value is regarded as the above Tf, the above Tp is indicated as Tp=0.5×(Tf+Ts) in a first-order differential curve of $F_{Fe}(t)$ (hereinafter, it may be referred to as "$f_{Fe}(t)$"). In the case, Ts may be approximated to ≈0, and thus, it may be approximated to Tp=0.5×Tf. The above reason is because the local maximum value of $f_{Fe}(t)$ corresponds to the interface between $SiO_2$ and the base steel sheet.

Herein, the local maximum value needs to be found in a range of t=0 second or more and Δt×100 seconds or less. The above reason is because the $SiO_2$ intermediate oxide film layer exists only in the surface of the sample, and does not exist inside the steel sheet, so that t becomes a relatively small value.

In the present electrical steel sheet, in order to improve the coating adhesion, the element M such as Mn, Al, or B needs to concentrate at a position of t=Tp which corresponds to a central area of the $SiO_2$ intermediate oxide film layer. However, since it is difficult to concentrate the element M such as Mn, Al, or B at the position of t=Tp, the element M is practically distributed to a range such that t is Ts to Tp.

Specifically, it is possible to confirm the solid-solution state of the element M which is solid-soluted in the $SiO_2$ intermediate oxide film layer using GDS spectrum originated from the element M (hereinafter, it may be referred to as "$F_M(t)$"). Specifically, a value where fM (t) is integrated in an integral range: t=Ts to Tp may satisfy the following formula (2).

[Formula 3]

$$\int_{Ts}^{Tp} f_M(t)dt>0 \quad (2)$$

Since the element M may be plural such as Mn, Al, or B, at least one selected from the group consisting of following formulas (3) to (5) may be satisfied.

[Formula 4]

$$\int_{Ts}^{Tp} f_{Mn}(t)dt>0 \quad (3)$$

$$\int_{Ts}^{Tp} f_{Al}(t)dt>0 \quad (4)$$

$$\int_{Ts}^{Tp} f_B(t)dt>0 \quad (5)$$

Herein, in the GDS measurement, t is not continuous, and $f_M(t)$ is a set of discontinuous points in the range such that t is Ts to Tp. Thus, each point of $f_M(t)$ is connected by a straight line and is approximated as a continuous function, and then, it is integrated. It may be an integrated value using Σ.

The element M such as Mn, Al, or B may be confirmed by chemical analysis. For instance, a sample which is the steel sheet before forming the tension-insulation coating or after removing the tension-insulation coating is dissolved by an iodine-alcohol procedure, and the $SiO_2$ intermediate oxide film layer is extracted. The extracted $SiO_2$ intermediate oxide film layer is chemical-analyzed using ICP or the like. Herewith, it is possible to confirm the element M included in the $SiO_2$ intermediate oxide film layer.

In regard to the solid-soluted amount (or concentrated amount) of the element M in the $SiO_2$ intermediate oxide film layer, those of Mn and Al may be 0.01% or more in mass %, and that of B may be 0.001% or more in mass %. Although an upper limit thereof is not particularly limited, it is difficult to solid-solute (concentrate) Mn and Al of more than 0.5%, and it is difficult to solid-solute (concentrate) B of more than 0.2%.

In order to confirm the effect for improving the coating adhesion by infrared reflection spectroscopy, GDS, chemical analysis, or the like, it is optical to use a sample which is the steel sheet after forming the $SiO_2$ intermediate oxide film layer on the surface of the steel sheet and before forming the tension-insulation coating. In a case where a sample is the steel sheet after forming the tension-insulation coating, the analysis may be conducted after completely removing only the tension-insulation coating by alkaline cleaning, pickling, ultrasonic cleaning with alcohol or water, or the like.

Moreover, in order to further clean the surface of the steel sheet sample after pickling, ultrasonic cleaning with alcohol or water, or the like, annealing may be conducted under conditions such as an atmosphere of 100% $H_2$, 800 to 1100° C., and 1 to 5 hours, and then, the analysis may be conducted. Since $SiO_2$ is a stable compound, even when the annealing is conducted, $SiO_2$ is not reduced, and the $SiO_2$ intermediate oxide film layer does not disappear.

<Producing Method>

In common with a method for producing a typical electrical steel sheet, the present electrical steel sheet is produced as follows. A steel piece is continuously cast after steel making in a converter. Hot rolling, hot band annealing, cold rolling, primary recrystallization annealing, and secondary recrystallization annealing are conducted. Annealing is conducted in order to form the $SiO_2$ intermediate oxide film layer. Annealing is conducted in order to form the tension-insulation coating.

The hot rolling may be a direct hot rolling or a continuous hot rolling, and heating temperature of the steel piece is not particularly limited. The cold rolling may be conducted two times or more, the cold rolling may be a warm rolling, and rolling reduction is not particularly limited. The secondary recrystallization annealing may be a batch annealing in a box furnace or a continuous annealing in a continuous furnace, and an annealing method is not particularly limited.

An annealing separator may include oxide such as alumina, magnesia, or silica, and type thereof is not particularly limited.

In order to form the $SiO_2$ intermediate oxide film layer when producing the grain oriented electrical steel sheet with excellent coating adhesion, it is important to adopt annealing conditions such that the $SiO_2$ intermediate oxide film layer is formed and that the metallic element M such as Mn is solid-soluted or concentrates in the $SiO_2$ intermediate oxide film layer. Specifically, it is important to adopt the temperature and time so that the metallic element M is solid-soluted or concentrates in the $SiO_2$ intermediate oxide film layer.

In the present electrical steel sheet, the $SiO_2$ intermediate oxide film layer is formed by annealing the steel sheet after secondary recrystallization under conditions such that an annealing temperature T1 is 600 to 1200° C.

When the annealing temperature is less than 600° C., $SiO_2$ is not formed, and the $SiO_2$ intermediate oxide film layer is not formed. Thus, the annealing temperature is 600° C. or more. On the other hand, when the annealing temperature is more than 1200° C., reaction for forming the $SiO_2$ intermediate oxide film layer becomes unstable, the interface between the $SiO_2$ intermediate oxide film layer and the base steel sheet becomes uneven, and thereby, the coating adhesion may deteriorate. Thus, the annealing temperature is 1200° C. or less. The annealing temperature is preferably 700 to 1100° C. which is a temperature range where $SiO_2$ precipitates.

In order to grow the $SiO_2$ intermediate oxide film layer and to secure the thickness required for obtaining excellent coating adhesion, the annealing time is 5 seconds or more. The annealing time is preferably 20 seconds or more. From the viewpoint of obtaining excellent coating adhesion, the annealing time may be long. However, from the viewpoint of productivity, an upper limit thereof may be 200 seconds. The annealing time is preferably 100 seconds or less.

Annealing atmosphere is to form externally oxidized silica (the $SiO_2$ intermediate oxide film layer) and to suppress formation of suboxide such as fayalite, wustite, or magnetite. Thus, an oxidation degree $P_{H2O}/P_{H2}$ which is ratio of water vapor partial pressure to hydrogen partial pressure in the annealing atmosphere is controlled to be within a following formula (6). The oxidation degree is preferably 0.05 or less.

$$P_{H2O}/P_{H2} \leq 0.15 \quad (6)$$

With a decrease in the oxidation degree $P_{H2O}/P_{H2}$, the externally oxidized silica (the $SiO_2$ intermediate oxide film layer) is easily formed, and thus, the effect of the present invention is easily obtained. However, it is difficult to control the oxidation degree $P_{H2O}/P_{H2}$ to be less than $5.0\times10^{-4}$, and thus, a practical lower limit thereof may be approximately $5.0\times10^{-4}$, as an industrially controllable value.

In order for the metallic element M such as Mn, Al, B to effectively be solid-soluted or concentrate in the $SiO_2$ intermediate oxide film layer, it is required to ensure the temperature where the metallic element M can be diffused. Thus, when cooling the steel sheet after the annealing for forming the $SiO_2$ intermediate oxide film layer, an average cooling rate in a temperature range of T2 (° C.) to T1 (° C.) which is the temperature range for the diffusion is 50° C./second or less. T2 is defined as a following formula (7). Hereinafter, the average cooling rate may be referred to as "CR1 (° C./second)".

Even when cooling the steel sheet by the average cooling rate CR1 of 50° C./second or less, the characteristics of the present electrical steel sheet is not impaired. Form the viewpoint of productivity, CR1 is preferably 0.1° C./second or more. When a cooling rate increases after cooling to T2 (° C.), thermal strain is induced, and thereby, the coating adhesion and the magnetic characteristics deteriorate. Thus, an average cooling rate CR2 in a temperature range of 100° C. to T2 (° C.) is to satisfy a following formula (8).

$$T2(° C.)=T1(° C.)-100 \quad (7)$$

$$CR1>CR2 \quad (8)$$

When forming the $SiO_2$ intermediate oxide film layer with excellent coating adhesion, a heating rate when the steel sheet is heated is important. Oxide other than $SiO_2$ not only reduces the adhesion of the tension-insulation coating, but also deteriorates the surface smoothness of the steel sheet, resulting in a decrease in the iron loss characteristics. Thus, it is required to adopt the heating rate so that the oxide other than $SiO_2$ is hardly formed.

Since $SiO_2$ is not stable as compared with other Fe based oxides as described in Non-Patent Document 1, it is preferable to adopt thermal history in the heating in order not to form the Fe based oxides. Specifically, when an average heating rate HR1 in a temperature range of 100° C. to 600° C. is 10° C./second or more, it is possible to suppress the formation of $Fe_XO$. Although it is preferable that the heating rate in the temperature range is as fast as possible, an upper limit of the average heating rate HR1 is preferably 200° C./second from an industrial standpoint. The average heating rate HR1 is preferably 20 to 150° C./second, and more preferably 50 to 100° C./second.

EXAMPLES

Hereinafter, the technical features of the aspect of the present invention will be described in detail with reference to the following examples. The condition in the following examples is an example condition employed to confirm the operability and the effects of the present invention, so that the present invention is not limited to the example condition. The present invention can employ various types of conditions as long as the conditions do not depart from the scope of the present invention and can achieve the object of the present invention.

Example 1

A silicon steel having a composition shown in Table 1-1 was annealed at 1100° C. for 60 minutes. The steel was hot-rolled to obtain a hot rolled steel sheet having thickness of 2.6 mm. The hot rolled steel sheet was annealed at 1100° C. and was pickled. The steel sheet was cold-rolled once or cold-rolled plural times with an intermediate annealing to obtain a cold rolled steel sheet having final thickness of 0.23 mm.

TABLE 1-1

| | | CHEMICAL COMPOSITION (mass %) | | | | | | | | | |
|---|---|---|---|---|---|---|---|---|---|---|---|
| | SLAB No. | C | Si | ACID-SOLUBLE Al | N | Mn | S | Cr | Cu | Sn | B |
| INVENTIVE EXAMPLE | A1 | 0.09 | 3.1 | 0.02 | 0.006 | 0.7 | 0.08 | — | — | — | — |
| | A2 | 0.09 | 2.7 | 0.02 | 0.004 | 0.7 | 0.08 | — | — | — | — |
| | A3 | 0.09 | 3.8 | 0.03 | 0.005 | 0.2 | 0.07 | — | — | — | — |
| | A4 | 0.09 | 2.9 | 0.03 | 0.008 | 0.2 | 0.05 | — | — | — | — |
| | A5 | 0.09 | 2.9 | 0.03 | 0.005 | 0.1 | 0.01 | — | — | — | — |
| | A6 | 0.07 | 3.0 | 0.03 | 0.006 | 0.1 | 0.01 | — | — | — | — |
| | A7 | 0.07 | 3.0 | 0.03 | 0.007 | 0.9 | 0.01 | — | — | — | — |
| | A8 | 0.07 | 3.3 | 0.06 | 0.004 | 0.3 | 0.01 | — | — | — | — |
| | A9 | 0.05 | 3.3 | 0.04 | 0.005 | 0.5 | 0.05 | — | — | — | — |
| | A10 | 0.05 | 3.3 | 0.04 | 0.008 | 0.2 | 0.03 | 0.01 | — | — | — |
| | A11 | 0.05 | 3.3 | 0.03 | 0.005 | 0.2 | 0.01 | — | 0.05 | — | — |
| | A12 | 0.05 | 3.3 | 0.03 | 0.008 | 0.1 | 0.01 | 0.1 | — | 0.05 | — |
| | A13 | 0.05 | 3.5 | 0.03 | 0.004 | 0.1 | 0.01 | 0.1 | 0.5 | — | — |
| | A14 | 0.05 | 3.5 | 0.03 | 0.007 | 0.5 | 0.04 | — | — | — | 0.003 |
| | A15 | 0.03 | 3.5 | 0.05 | 0.006 | 0.5 | 0.03 | 0.4 | — | 0.1 | — |
| | A16 | 0.03 | 3.5 | 0.05 | 0.008 | 0.5 | 0.03 | 0.2 | 0.02 | 0.2 | — |
| | A17 | 0.03 | 3.5 | 0.05 | 0.006 | 0.5 | 0.03 | 0.4 | 0.02 | 0.2 | 0.005 |
| COMPARATIVE EXAMPLE | a1 | 0.11 | 3.2 | 0.02 | 0.007 | 0.4 | 0.03 | — | — | — | — |
| | a2 | 0.02 | 2.4 | 0.02 | 0.006 | 0.4 | 0.03 | — | — | — | — |
| | a3 | 0.03 | 4.1 | 0.02 | 0.008 | 0.6 | 0.03 | — | — | — | — |
| | a4 | 0.03 | 3.2 | 0.08 | 0.006 | 0.5 | 0.04 | — | — | — | — |
| | a5 | 0.03 | 3.3 | 0.08 | 0.015 | 0.4 | 0.04 | — | — | — | — |
| | a6 | 0.03 | 3.3 | 0.03 | 0.015 | 1.15 | 0.04 | — | — | — | — |
| | a7 | 0.04 | 3.2 | 0.03 | 0.007 | 0.5 | 0.09 | — | — | — | — |

The cold rolled steel sheet having the final thickness of 0.23 mm was subjected to decarburization annealing and nitriding annealing. The annealing separator which was water slurry containing alumina as a main component was applied to the steel sheet, and then, the final annealing was conducted at 1200° C. for 20 hours. The final annealed sheet was annealed under conditions such that the oxidation degree $P_{H2O}/P_{H2}$ was 0.12, the annealing temperature T1 was 1000° C., the annealing time was 30 seconds, the average heating rate HR1 in the temperature range of 100° C. to 600° C. was 30° C./second, and thereby, the $SiO_2$ intermediate oxide film layer was formed on the surface of the steel sheet.

Herein, the average cooling rate CR1 in the temperature range of T2° C. (800° C.) to T1° C. (900° C.) was 50° C./second, and the average cooling rate CR2 in the temperature range of 100° C. or more and less than T2° C. (800° C.) was 30° C./second.

Insulation coating forming solution was applied on the surface of the steel sheet, the baking was conducted, and thereby, the tension-insulation coating was formed. The chemical composition of the base steel sheet in the produced grain oriented electrical steel sheet is shown in Table 1-2. Moreover, the coating adhesion of the insulation coating was evaluated, and the magnetic characteristics (magnetic flux density) were evaluated.

be "VG (very good)", the area fraction of 90% to less than 95% was judged to be "G (good)", the area fraction of 80% to less than 90% was judged to be "F (fair)", and the area fraction of less than 80% was judged to be "B (bad)".

The magnetic characteristics were evaluated on the basis of JIS C 2550. The magnetic flux density B8 was measured. B8 is the magnetic flux density under the magnetic field of 800 A/m, and becomes the judgment criteria whether the secondary recrystallization occurs properly. When B8 was 1.89 T or more, the secondary recrystallization was judged to occur properly.

For some steel sheets, the tension-insulation coating was not formed after forming the $SiO_2$ intermediate oxide film layer, and then, the steel sheet was subjected to the evaluation of the thickness of the $SiO_2$ intermediate oxide film layer and the state of lattice matching of the $SiO_2$ intermediate oxide film layer. The thickness of the $SiO_2$ intermediate oxide film layer was measured by TEM observation on the basis of a method disclosed in Patent Document 25. The state of lattice matching of the $SiO_2$ intermediate oxide film layer was analyzed by the infrared reflection spectroscopy. The evaluation results are shown in Table 2.

TABLE 1-2

| | | CHEMICAL COMPOSITION (mass %) | | | | | | | | | |
|---|---|---|---|---|---|---|---|---|---|---|---|
| | STEEL No. | C | Si | ACID-SOLUBLE Al | N | Mn | S | Cr | Cu | Sn | B |
| INVENTIVE EXAMPLE | A1 | 0.002 | 3.10 | 0.002 | 0.003 | 0.70 | 0.018 | — | — | — | — |
| | A2 | 0.001 | 2.70 | 0.003 | 0.002 | 0.70 | 0.003 | — | — | — | — |
| | A3 | 0.002 | 3.80 | 0.003 | 0.001 | 0.20 | 0.003 | — | — | — | — |
| | A4 | 0.001 | 2.90 | 0.009 | 0.002 | 0.20 | 0.002 | — | — | — | — |
| | A5 | 0.001 | 2.90 | 0.004 | 0.011 | 0.10 | 0.001 | — | — | — | — |
| | A6 | 0.001 | 3.00 | 0.002 | 0.003 | 0.10 | 0.002 | — | — | — | — |
| | A7 | 0.002 | 3.00 | 0.002 | 0.003 | 0.90 | 0.001 | — | — | — | — |
| | A8 | 0.001 | 3.30 | 0.003 | 0.002 | 0.30 | 0.003 | — | — | — | — |
| | A9 | 0.001 | 3.30 | 0.002 | 0.002 | 0.50 | 0.002 | — | — | — | — |
| | A10 | 0.001 | 3.30 | 0.001 | 0.002 | 0.20 | 0.001 | 0.01 | — | — | — |
| | A11 | 0.002 | 3.30 | 0.002 | 0.003 | 0.20 | 0.002 | — | 0.05 | — | — |
| | A12 | 0.002 | 3.30 | 0.002 | 0.002 | 0.10 | 0.002 | 0.1 | — | 0.05 | — |
| | A13 | 0.002 | 3.50 | 0.003 | 0.003 | 0.10 | 0.003 | 0.1 | 0.5 | — | — |
| | A14 | 0.001 | 3.50 | 0.002 | 0.001 | 0.50 | 0.002 | — | — | — | 0.003 |
| | A15 | 0.001 | 3.50 | 0.004 | 0.002 | 0.50 | 0.001 | 0.4 | — | 0.1 | — |
| | A16 | 0.002 | 3.50 | 0.004 | 0.003 | 0.50 | 0.002 | 0.2 | 0.02 | 0.2 | — |
| | A17 | 0.001 | 3.50 | 0.003 | 0.002 | 0.50 | 0.001 | 0.4 | 0.02 | 0.2 | 0.005 |
| COMPARATIVE EXAMPLE | a1 | 0.014 | 3.20 | 0.003 | 0.002 | 0.40 | 0.002 | — | — | — | — |
| | a2 | 0.001 | 2.40 | 0.003 | 0.003 | 0.40 | 0.003 | — | — | — | — |
| | a3 | 0.001 | 4.10 | 0.002 | 0.002 | 0.60 | 0.002 | — | — | — | — |
| | a4 | 0.001 | 3.20 | 0.013 | 0.002 | 0.50 | 0.003 | — | — | — | — |
| | a5 | 0.001 | 3.30 | 0.002 | 0.015 | 0.40 | 0.002 | — | — | — | — |
| | a6 | 0.001 | 3.30 | 0.002 | 0.001 | 1.15 | 0.002 | — | — | — | — |
| | a7 | 0.001 | 3.20 | 0.001 | 0.002 | 0.50 | 0.023 | — | | | — |

The coating adhesion of the tension-insulation coating was evaluated by rolling a test piece around cylinder with 20 mm of diameter and by measuring an area fraction of remained coating after bending 180°. In regard to the area fraction of remained coating without delamination from the steel sheet, the area fraction of 95% or more was judged to

TABLE 2

| | | | $SiO_2$ INTERMEDIATE OXIDE FILM LAYER | | | MAGNETIC | |
|---|---|---|---|---|---|---|---|
| | MARK | STEEL No. | AVERAGE THICKNESS (nm) | VALUE OF $I_B/I_A$ | COATING ADHESION | CHARACTERISTICS B8 (T) | NOTE |
| INVENTIVE EXAMPLE | B1 | A1 | 3 | 5.5 | F | 1.90 | |
| | B2 | A2 | 981 | 6.5 | F | 1.91 | |
| | B3 | A4 | 905 | 7.5 | F | 1.92 | |
| | B4 | A3 | 859 | 7.6 | F | 1.90 | |
| | B5 | A5 | 714 | 5.1 | F | 1.93 | |
| | B6 | A8 | 426 | 3.4 | G | 1.91 | |
| | B7 | A10 | 605 | 2.8 | G | 1.90 | Cr |
| | B8 | A11 | 620 | 3.4 | G | 1.91 | Cu |

TABLE 2-continued

| | MARK | STEEL No. | SiO2 INTERMEDIATE OXIDE FILM LAYER AVERAGE THICKNESS (nm) | VALUE OF $I_B/I_A$ | COATING ADHESION | MAGNETIC CHARACTERISTICS B8 (T) | NOTE |
|---|---|---|---|---|---|---|---|
| | B9 | A12 | 510 | 3.5 | G | 1.91 | Cr, Sn |
| | B10 | A14 | 623 | 3.4 | G | 1.92 | B |
| | B11 | A13 | 658 | 3.2 | G | 1.92 | Cr, Cu |
| | B12 | A15 | 625 | 2.5 | G | 1.90 | Cr, Sn |
| | B13 | A16 | 188 | 0.7 | VG | 1.91 | Cr, Cu, Sn |
| COMPARATIVE EXAMPLE | b1 | a1 | 358 | 0.004 | B | 1.54 | |
| | b2 | a2 | 0.5 | 0.09 | B | 1.55 | |
| | b3 | a3 | — | — | — | — | COLD ROLLING COULD NOT BE CONDUCTED |
| | b4 | a4 | — | — | — | — | COLD ROLLING COULD NOT BE CONDUCTED |
| | b5 | a5 | — | — | — | — | COLD ROLLING COULD NOT BE CONDUCTED |
| | b6 | a6 | 0.8 | 0.003 | B | 1.48 | |
| | b7 | a7 | 1653 | 0.005 | B | 1.89 | |

B1 to B13 were inventive examples. In B1 to B13, it was confirmed that the effect of present invention was obtained. Among them, B1 to B6 did not include optional elements. The S content in B1, the Si content in B2 and B4, the acid-soluble Al content in B3, and the N content in B5 were respectively out of the preferable range, and thus, the evaluation results became "F". Although B6 did not include optional elements, excellent result of "G" was obtained, because Si, Mn, acid-soluble Al, and N were controlled to be within the preferable range or the more preferable range in B6. B7 to B13 included at least one of Cr, Cu, Sn, or B as optional elements. B7 to B12 included at least one of Cr, Cu, Sn, or B as optional elements, and thus, excellent result of "G" was obtained. B13 included three elements of Cr, Cu, and Sn, and thus, more excellent result of "VG" was obtained.

On the other hand, b1 to b7 were comparative examples. The Si content in b3, the acid-soluble Al content in b4, and the N content in b5 were excessive. Thus, the steel sheets became brittle in room temperature, and the cold rolling could not be conducted. The coating adhesion could not be evaluated in b3 to b5.

The amount of additive elements in b1, b2, and b6, was out of the range of the present invention. Thus, the secondary recrystallization did not occur in b1, b2, and b6. In the steel sheet in which the secondary recrystallization did not occur, the coating adhesion thereof was insufficient. It seemed that, when the secondary recrystallization did not occur, grain size of the steel sheet was fine, the surface was uneven, and the $SiO_2$ intermediate oxide film layer was not properly formed. The S content of b7 excessed the upper limit of the present invention, the $SiO_2$ intermediate oxide film layer was not properly formed, and thus, the coating adhesion was insufficient.

Example 2

The silicon steel having the composition shown in Table 1-1 was annealed at 1100° C. for 60 minutes. The steel was hot-rolled to obtain the hot rolled steel sheet having thickness of 2.6 mm. The hot rolled steel sheet was annealed at 1100° C. and was pickled. The steel sheet was cold-rolled once or cold-rolled plural times with the intermediate annealing to obtain the cold rolled steel sheet having final thickness of 0.23 mm.

The cold rolled steel sheet having the final thickness of 0.23 mm was subjected to decarburization annealing and nitriding annealing. The annealing separator which was water slurry containing alumina as the main component was applied to the steel sheet, and then, the final annealing was conducted at 1200° C. for 20 hours. The final annealed sheet was annealed under conditions such that the oxidation degree $P_{H2O}/P_{H2}$ was 0.01, the annealing temperature T1 was 800° C., the annealing time was 60 seconds, the average heating rate HR1 in the temperature range of 100° C. to 600° C. was 90° C./second, and thereby, the $SiO_2$ intermediate oxide film layer was formed on the surface of the steel sheet.

Herein, the average cooling rate CR1 in the temperature range of T2° C. (700° C.) to T1° C. (800° C.) was 50° C./second, and the average cooling rate CR2 in the temperature range of 100° C. or more and less than T2° C. (700° C.) was 30° C./second.

The insulation coating forming solution was applied on the surface of the steel sheet, the baking was conducted, and thereby, the tension-insulation coating was formed. The coating adhesion of the insulation coating was evaluated, and the magnetic characteristics (magnetic flux density) were evaluated.

For some steel sheets, the tension-insulation coating was not formed after forming the $SiO_2$ intermediate oxide film layer, and then, the steel sheet was subjected to the evaluation of the thickness of the $SiO_2$ intermediate oxide film layer, the state of lattice matching of the S102 intermediate oxide film layer, and the state of solid-soluted Mn in the $SiO_2$ intermediate oxide film layer. The state of solid-soluted Mn was analyzed by GDS.

The thickness of the $SiO_2$ intermediate oxide film layer, the state of lattice matching of the $SiO_2$ intermediate oxide film layer analyzed by the infrared reflection spectroscopy, the state of solid-soluted Mn, Al, and B analyzed by GDS, and the evaluation results of the coating adhesion are shown in Table 3. In the GDS measurement, the measurement time was 100 seconds, and the time interval was 0.05 seconds. The measurement and the evaluation were conducted on the basis of those in Example 1.

The chemical composition of the base steel sheet in the produced grain oriented electrical steel sheet is shown in Table 1-2. The steel sheet which satisfied the formulas (3) to (5) was judged to be "OK", and the steel sheet which did not satisfy the formulas (3) to (5) was judged to be "NG".

TABLE 3

| | | | $SIO_2$ INTERMEDIATE OXIDE FILM LAYER | | | | | | MAGNETIC CHARACTERISTICS | |
|---|---|---|---|---|---|---|---|---|---|---|
| | | | AVERAGE | VALUE | GDS SURFACE ANALYSIS | | | | | |
| | MARK | STEEL No. | THICKNESS (nm) | OF $I_B/I_A$ | FORMULA(3) - Mn | FORMULA(4) - Al | FORMULA(5) - B | COATING ADHESION | B8 (T) | NOTE |
| INVENTIVE EXAMPLE | C1 | A6 | 695 | 2.8 | NG | NG | NG | G | 1.91 | |
| | C2 | A9 | 528 | 2.9 | NG | NG | NG | G | 1.90 | |
| | C3 | A10 | 525 | 2.9 | NG | NG | NG | G | 1.91 | Cr |
| | C4 | A11 | 411 | 1.8 | OK | NG | NG | G | 1.91 | Cu |
| | C5 | A12 | 539 | 4.5 | NG | OK | NG | G | 1.92 | Sn |
| | C6 | A14 | 680 | 2.4 | NG | NG | OK | G | 1.91 | B |
| | C7 | A17 | 23 | 0.8 | OK | OK | OK | VG | 1.92 | Cr, Cu, Sn, B |

C1 to C7 were inventive examples. In C1 to C7, it was confirmed by the infrared reflection spectroscopy that the $SiO_2$ intermediate oxide film layer with excellent lattice matching was formed.

C7 included four elements of Cr, Cu, Sn, and B as optional elements. Thus, in C7, more excellent coating adhesion of "VG" was obtained as compared with C1 to C6. Herein, C1 to C6 did not include optional elements or included only one element in optional elements, and the evaluation thereof was "G".

Example 3

The silicon steel having the composition shown in Table 1-1 was annealed at 1100° C. for 60 minutes. The steel was hot-rolled to obtain the hot rolled steel sheet having thickness of 2.6 mm. The hot rolled steel sheet was annealed at 1100° C. and was pickled. The steel sheet was cold-rolled once or cold-rolled plural times with the intermediate annealing to obtain the cold rolled steel sheet having final thickness of 0.23 mm.

The cold rolled steel sheet having the final thickness of 0.23 mm was subjected to decarburization annealing and nitriding annealing. The annealing separator which was water slurry containing alumina as the main component was applied to the steel sheet, and then, the final annealing was conducted at 1200° C. for 20 hours. The final annealed sheet was annealed under conditions shown in Table 4-1 and Table 4-2, and thereby, the $SiO_2$ intermediate oxide film layer was formed on the surface of the steel sheet. The insulation coating forming solution was applied on the surface of the steel sheet, the baking was conducted, and thereby, the tension-insulation coating was formed. The coating adhesion of the insulation coating was evaluated, and the magnetic characteristics (magnetic flux density) were evaluated.

The chemical composition of the base steel sheet in the produced grain oriented electrical steel sheet is shown in Table 1-2.

The thickness of the $SiO_2$ intermediate oxide film layer, the state of lattice matching of the $SiO_2$ intermediate oxide film layer analyzed by the infrared reflection spectroscopy, and the evaluation results of the coating adhesion are shown in in Table 4-1 and Table 4-2. The measurement and the evaluation were conducted on the basis of those in Example 1.

TABLE 4-1

| | | | FORMING CONDITIONS OF $SIO_2$ INTERMEDIATE OXIDE FILM LAYER | | | | | | $SIO_2$ INTERMEDIATE OXIDE FILM LAYER | | |
|---|---|---|---|---|---|---|---|---|---|---|---|
| | MARK | STEEL No. | ANNEALING TEMPERATURE (° C.) | ANNEALING TIME (SECOND) | OXIDATION DEGREE | HR1 (° C./SECOND) | COOLING RATE CR1 (° C./SECOND) | COOLING RATE CR2 (° C./SECOND) | AVERAGE THICKNESS (nm) | VALUE OF $I_B/I_A$ | COATING ADHESION |
| INVENTIVE EXAMPLE | D1 | A7 | 650 | 180 | 0.10 | 15 | 40 | 20 | 755 | 7.5 | F |
| | D2 | A7 | 650 | 180 | 0.10 | 15 | 40 | 20 | 780 | 8.6 | F |
| | D3 | A7 | 650 | 180 | 0.10 | 15 | 40 | 20 | 815 | 7.2 | F |
| | D4 | A7 | 750 | 60 | 0.05 | 140 | 35 | 20 | 652 | 2.5 | G |
| | D5 | A7 | 750 | 60 | 0.05 | 140 | 35 | 20 | 653 | 2.3 | G |
| | D6 | A7 | 750 | 60 | 0.05 | 140 | 35 | 20 | 518 | 3.4 | G |
| | D7 | A7 | 750 | 60 | 0.005 | 50 | 20 | 5 | 526 | 1.3 | G |
| | D8 | A7 | 750 | 60 | 0.005 | 50 | 20 | 5 | 484 | 1.7 | G |
| | D9 | A7 | 750 | 60 | 0.005 | 50 | 20 | 5 | 435 | 1.4 | G |
| | D10 | A12 | 1150 | 10 | 0.10 | 180 | 40 | 20 | 425 | 3.2 | G |
| | D11 | A12 | 1150 | 10 | 0.10 | 180 | 40 | 20 | 518 | 4.2 | G |
| | D12 | A12 | 1150 | 10 | 0.10 | 180 | 40 | 20 | 687 | 3.9 | G |
| | D13 | A12 | 850 | 50 | 0.05 | 20 | 35 | 20 | 552 | 2.3 | G |
| | D14 | A12 | 850 | 50 | 0.05 | 20 | 35 | 20 | 409 | 4.1 | G |

TABLE 4-1-continued

| | | | FORMING CONDITIONS OF $SiO_2$ INTERMEDIATE OXIDE FILM LAYER | | | | | | $SiO_2$ INTERMEDIATE OXIDE FILM LAYER | | |
|---|---|---|---|---|---|---|---|---|---|---|---|
| | MARK | STEEL No. | ANNEALING TEMPERATURE (° C.) | ANNEALING TIME (SECOND) | OXIDATION DEGREE | HR1 (° C./SECOND) | COOLING RATE CR1 (° C./SECOND) | COOLING RATE CR2 (° C./SECOND) | AVERAGE THICKNESS (nm) | VALUE OF $I_B/I_A$ | COATING ADHESION |
| | D15 | A12 | 850 | 50 | 0.05 | 20 | 35 | 20 | 645 | 3.9 | G |
| | D16 | A12 | 850 | 50 | 0.005 | 70 | 20 | 5 | 256 | 0.8 | VG |
| | D17 | A12 | 850 | 50 | 0.005 | 70 | 20 | 5 | 98 | 0.7 | VG |
| | D18 | A12 | 850 | 50 | 0.005 | 70 | 20 | 5 | 121 | 0.6 | VG |
| | D19 | A16 | 650 | 110 | 0.10 | 15 | 40 | 20 | 7 | 4.1 | G |
| | D20 | A16 | 650 | 110 | 0.10 | 15 | 40 | 20 | 8 | 2.5 | G |

TABLE 4-2

| | | | FORMING CONDITIONS OF $SiO_2$ INTERMEDIATE OXIDE FILM LAYER | | | | | | $SiO_2$ INTERMEDIATE OXIDE FILM LAYER | | |
|---|---|---|---|---|---|---|---|---|---|---|---|
| | MARK | STEEL No. | ANNEALING TEMPERATURE (° C.) | ANNEALING TIME (SECOND) | OXIDATION DEGREE | HR1 (° C./SECOND) | COOLING RATE CR1 (° C./SECOND) | COOLING RATE CR2 (° C./SECOND) | AVERAGE THICKNESS (nm) | VALUE OF $I_B/I_A$ | COATING ADHESION |
| INVENTIVE EXAMPLE | D21 | A16 | 650 | 110 | 0.10 | 15 | 40 | 20 | 634 | 3.3 | G |
| | D22 | A16 | 1100 | 20 | 0.05 | 30 | 35 | 20 | 12 | 0.5 | VG |
| | D23 | A16 | 1100 | 20 | 0.05 | 30 | 35 | 20 | 394 | 0.4 | VG |
| | D24 | A16 | 1100 | 20 | 0.05 | 30 | 35 | 20 | 324 | 0.1 | VG |
| | D25 | A16 | 1100 | 20 | 0.005 | 90 | 20 | 5 | 218 | 0.8 | VG |
| | D26 | A16 | 1100 | 20 | 0.005 | 90 | 20 | 5 | 154 | 0.7 | VG |
| | D27 | A16 | 1100 | 20 | 0.005 | 90 | 20 | 5 | 77 | 0.7 | VG |
| COMPARATIVE EXAMPLE | d1 | A8 | 520 | 180 | 0.01 | 50 | 40 | 20 | 0.5 | 4.9 | B |
| | d2 | A8 | 1180 | 3 | 0.02 | 50 | 55 | 15 | 0.8 | 6.5 | B |
| | d3 | A8 | 1180 | 180 | 0.18 | 50 | 50 | 20 | 0.8 | 7.8 | B |
| | d4 | A12 | 1150 | 180 | 0.14 | 50 | 60 | 70 | 1250 | 0.003 | B |
| | d5 | A12 | 1250 | 200 | 0.12 | 50 | 30 | 15 | 1220 | 0.006 | B |
| | d6 | A12 | 1180 | 180 | 0.05 | 210 | 30 | 15 | 59 | 0.008 | B |
| | d7 | A16 | 1180 | 180 | 0.05 | 8 | 30 | 15 | 942 | 0.006 | B |
| | d8 | A16 | 1180 | 180 | 0.01 | 50 | 60 | 15 | 785 | 0.007 | B |
| | d9 | A16 | 1180 | 180 | 0.01 | 50 | 30 | 75 | 852 | 0.005 | B |

D1 to D27 were inventive examples. In D1 to D27, it was confirmed that the effect of present invention was obtained.

In D1 to D3 among D1 to D9, the annealing temperature, the annealing time, the average heating rate HR1, and the oxidation degree were out of the preferable range, and thus, the evaluation result became "F". On the other hand, in D4 to D6, the annealing temperature, the annealing time, the average heating rate HR1, and the oxidation degree were controlled to be within the preferable range, and thus, excellent result of "G" was obtained.

In G7 to G9, the annealing temperature, the annealing time, and the oxidation degree were controlled to be within the preferable range, and the average heating rate HR1 was controlled to be within the more preferable range. Thus, excellent coating adhesion of "G" was obtained.

In D10 to D13, although the annealing temperature, the annealing time, the average heating rate HR1, and the oxidation degree were out of the preferable range, Cr and Sn were included as optional elements, and thus, excellent coating adhesion of "G" was obtained.

In D14 and D15, the annealing temperature, the annealing time, the average heating rate HR1, and the oxidation degree were controlled to be within the preferable range, and Cr and Sn were included as optional elements. Thus, excellent coating adhesion of "G" was obtained.

In D16 to D18, the annealing temperature, the annealing time, and the oxidation degree were controlled to be within the preferable range, Cr and Sn were included as optional elements, and also, the average heating rate HR1 was controlled to be within the more preferable range. Thus, more excellent coating adhesion of "VG" was obtained.

In D19 to D21, although the annealing temperature, the annealing time, the average heating rate HR1, and the oxidation degree were out of the preferable range, Cr, Cu, and Sn were included as optional elements, and thus, excellent coating adhesion of "G" was obtained. In D22 to D27, the annealing temperature, the annealing time, and the oxidation degree were controlled to be within the preferable range, and thus, more excellent coating adhesion of "VG" was obtained.

On the other hand, d1 to d9 were comparative examples. In d1 to d3 and d5, at least one of the annealing temperature, the annealing time, and the oxidation degree for forming the $SiO_2$ intermediate oxide film layer was out of the range of the present invention. Thus, the $SiO_2$ intermediate oxide film layer was not formed, and the infrared reflection spectroscopy could not be conducted.

In d4, d8, and d9, since the cooling rate for the $SiO_2$ intermediate oxide film layer was out of the range of the present invention, the state of lattice matching of the $SiO_2$ intermediate oxide film layer was insufficient, and thus, the evaluation result of the coating adhesion was "B".

Since HR1 in d6 more than the upper limit and HR1 in d7 was less than the lower limit, Fe based oxides were excessively formed, and thus, the evaluation result of the coating adhesion became "B".

INDUSTRIAL APPLICABILITY

As described above, according to the above aspects of the present invention, it is possible to form the tension-insulation coating with excellent coating adhesion and without deteriorating the magnetic characteristics and its stability on the surface of the grain oriented electrical steel sheet after the final annealing where the glass film is purposely suppressed to be formed, the glass film is removed by grinding, pickling, or the like, or the surface of the steel sheet is smoothened to be the mirror like surface. Accordingly, the present invention has significant industrial applicability for utilizing and producing the grain oriented electrical steel sheet.

What is claimed is:

1. A grain oriented electrical steel sheet comprising:

a base steel sheet;

an intermediate oxide film layer which is arranged on the base steel sheet, includes $SiO_2$, and has an average thickness of 1.0 nm to 1.0 μm; and a tension-insulation coating which is arranged on the intermediate oxide film layer, wherein the base steel sheet includes: as a chemical composition, by mass %, 0.010% or less of C;

2.50 to 4.00% of Si;

0.010% or less of acid soluble Al;

0.012% or less of N;

1.00% or less of Mn;

0.020% or less of S; and a balance comprising Fe and impurities, and wherein, when a surface of the intermediate oxide film layer is analyzed by an infrared reflection spectroscopy, a peak intensity $I_A$ at 1250 $cm^{-1}$ and a peak intensity $I_B$ at 1200 $cm^{-1}$ satisfy a following formula (1), $$I_B/I_A \geq 0.010 \quad (1).$$

2. The grain oriented electrical steel sheet according to claim 1, wherein the base steel sheet further includes, as the chemical composition, by mass %, 0.001 to 0.010% of B.

3. The grain oriented electrical steel sheet according to claim 1, wherein the base steel sheet further includes: as the chemical composition, by mass %, at least one selected from 0.01 to 0.20% of Sn;

0.01 to 0.50% of Cr; and 0.01 to 0.50% of Cu.

4. The grain oriented electrical steel sheet according to claim 2, wherein the base steel sheet further includes: as the chemical composition, by mass %, at least one selected from 0.01 to 0.20% of Sn;

0.01 to 0.50% of Cr; and 0.01 to 0.50% of Cu.

5. The grain oriented electrical steel sheet according claim 1, wherein a time differential curve $f_M(t)$ of a glow discharge optical emission spectrum of an element M (M: Mn, Al, B) in a surface of the intermediate oxide film layer satisfies a following formula (2), $$\int_{Ts}^{Tp} f_M(t)dt > 0 \quad (2)$$

Tp: a time t (second) corresponding to a local minimum value of a second-order time differential curve of a glow discharge optical emission spectrum of Si, Ts: a time t (second) corresponding to an analysis starting point of a glow discharge optical emission spectrum of Si.

6. The grain oriented electrical steel sheet according to claim 2, wherein a time differential curve $f_M(t)$ of a glow discharge optical emission spectrum of an element M (M: Mn, Al, B) in a surface of the intermediate oxide film layer satisfies a following formula (2), $$\int_{Ts}^{Tp} f_M(t)dt > 0 \quad (2)$$

Tp: a time t (second) corresponding to a local minimum value of a second-order time differential curve of a glow discharge optical emission spectrum of Si, Ts: a time t (second) corresponding to an analysis starting point of a glow discharge optical emission spectrum of Si.

7. The grain oriented electrical steel sheet according to claim 3, wherein a time differential curve $f_M(t)$ of a glow discharge optical emission spectrum of an element M (M: Mn, Al, B) in a surface of the intermediate oxide film layer satisfies a following formula (2), $$\int_{Ts}^{Tp} f_M(t)dt > 0 \quad (2)$$

Tp: a time t (second) corresponding to a local minimum value of a second-order time differential curve of a glow discharge optical emission spectrum of Si, Ts: a time t (second) corresponding to an analysis starting point of a glow discharge optical emission spectrum of Si.

8. The grain oriented electrical steel sheet according to claim 4, wherein a time differential curve $f_M(t)$ of a glow discharge optical emission spectrum of an element M (M: Mn, Al, B) in a surface of the intermediate oxide film layer satisfies a following formula (2), $$\int_{Ts}^{Tp} f_M(t)dt > 0 \quad (2)$$

Tp: a time t (second) corresponding to a local minimum value of a second-order time differential curve of a glow discharge optical emission spectrum of Si, Ts: a time t (second) corresponding to an analysis starting point of a glow discharge optical emission spectrum of Si.

9. A method for producing the grain oriented electrical steel sheet according to claim 1, the method comprising an oxide film layer forming process of forming an intermediate oxide film layer on a steel sheet, wherein, in the oxide film layer forming process, an annealing is conducted under conditions such that an annealing temperature T1 is 600 to 1200° C., an annealing time is 5 to 200 seconds, an oxidation degree $P_{H2O}/P_{H2}$ is 0.15 or less, and an average heating rate HR1 in a temperature range of 100° C. to 600° C. is 10 to 200° C./second, and after the annealing, an average cooling rate CR1 in a temperature range of T2° C. to T1° C. is 50° C./second or less, and an average cooling rate CR2 in a temperature range of 100° C. or more and less than T2° C. is slower than CR1, when T2 is a temperature expressed in T1° C.-100° C.

10. A method for producing the grain oriented electrical steel sheet according to claim 7, the method comprising an oxide film layer forming process of forming an intermediate oxide film layer on a steel sheet, wherein, in the oxide film layer forming process, an annealing is conducted under conditions such that an annealing temperature T1 is 600 to 1200° C., an annealing time is 5 to 200 seconds, an oxidation degree $P_{H2O}/P_{H2}$ is 0.15 or less, and an average heating rate HR1 in a temperature range of 100° C. to 600° C. is 10 to 200° C./second, and after the annealing, an average cooling rate CR1 in a temperature range of T2° C. to T1° C. is 50° C./second or less, and an average cooling rate CR2 in a temperature range of 100° C. or more and less than T2° C. is slower than CR1, when T2 is a temperature expressed in T1° C.-100° C.

11. A method for producing the grain oriented electrical steel sheet according to claim 3, the method comprising an oxide film layer forming process of forming an intermediate oxide film layer on a steel sheet, wherein, in the oxide film layer forming process, an annealing is conducted under conditions such that an annealing temperature T1 is 600 to 1200° C., an annealing time is 5 to 200 seconds, an oxidation degree $P_{H2O}/P_{H2}$ is 0.15 or less, and an average heating rate HR1 in a temperature range of 100° C. to 600° C. is 10 to 200° C./second, and after the annealing, an average cooling rate CR1 in a temperature range of T2° C. to T1° C. is 50° C./second or less, and an average cooling rate CR2 in a temperature range of 100° C. or more and less than T2° C. is slower than CR1, when T2 is a temperature expressed in T1° C.-100° C.

12. A method for producing the grain oriented electrical steel sheet according to claim 4, the method comprising an oxide film layer forming process of forming an intermediate oxide film layer on a steel sheet, wherein, in the oxide film layer forming process, an annealing is conducted under conditions such that an annealing temperature T1 is 600 to 1200° C., an annealing time is 5 to 200 seconds, an oxidation degree $P_{H2O}/P_{H2}$ is 0.15 or less, and an average heating rate HR1 in a temperature range of 100° C. to 600° C. is 10 to 200° C./second, and after the annealing, an average cooling rate CR1 in a temperature range of T2° C. to T1° C. is 50° C./second or less, and an average cooling rate CR2 in a temperature range of 100° C. or more and less than T2° C. is slower than CR1, when T2 is a temperature expressed in T1° C.-100° C.

13. A method for producing the grain oriented electrical steel sheet according to claim 5, the method comprising an oxide film layer forming process of forming an intermediate oxide film layer on a steel sheet, wherein, in the oxide film layer forming process, an annealing is conducted under conditions such that an annealing temperature T1 is 600 to 1200° C., an annealing time is 5 to 200 seconds, an oxidation degree $P_{H2O}/P_{H2}$ is 0.15 or less, and an average heating rate HR1 in a temperature range of 100° C. to 600° C. is 10 to 200° C./second, and after the annealing, an average cooling rate CR1 in a temperature range of T2° C. to T1° C. is 50° C./second or less, and an average cooling rate CR2 in a temperature range of 100° C. or more and less than T2° C. is slower than CR1, when T2 is a temperature expressed in T1° C.-100° C.

14. A method for producing the grain oriented electrical steel sheet according to claim 6, the method comprising an oxide film layer forming process of forming an intermediate oxide film layer on a steel sheet, wherein, in the oxide film layer forming process, an annealing is conducted under conditions such that an annealing temperature T1 is 600 to 1200° C., an annealing time is 5 to 200 seconds, an oxidation degree $P_{H2O}/P_{H2}$ is 0.15 or less, and an average heating rate HR1 in a temperature range of 100° C. to 600° C. is 10 to 200° C./second, and after the annealing, an average cooling rate CR1 in a temperature range of T2° C. to T1° C. is 50° C./second or less, and an average cooling rate CR2 in a temperature range of 100° C. or more and less than T2° C. is slower than CR1, when T2 is a temperature expressed in T1° C.-100° C.

15. A method for producing the grain oriented electrical steel sheet according to claim 7, the method comprising an oxide film layer forming process of forming an intermediate oxide film layer on a steel sheet, wherein, in the oxide film layer forming process, an annealing is conducted under conditions such that an annealing temperature T1 is 600 to 1200° C., an annealing time is 5 to 200 seconds, an oxidation degree $P_{H2O}/P_{H2}$ is 0.15 or less, and an average heating rate HR1 in a temperature range of 100° C. to 600° C. is 10 to 200° C./second, and after the annealing, an average cooling rate CR1 in a temperature range of T2° C. to T1° C. is 50° C./second or less, and an average cooling rate CR2 in a temperature range of 100° C. or more and less than T2° C. is slower than CR1, when T2 is a temperature expressed in T1° C.-100° C.

16. A method for producing the grain oriented electrical steel sheet according to claim 8, the method comprising an oxide film layer forming process of forming an intermediate oxide film layer on a steel sheet, wherein, in the oxide film layer forming process, an annealing is conducted under conditions such that an annealing temperature T1 is 600 to 1200° C., an annealing time is 5 to 200 seconds, an oxidation degree $P_{H2O}/P_{H2}$ is 0.15 or less, and an average heating rate HR1 in a temperature range of 100° C. to 600° C. is 10 to 200° C./second, and after the annealing, an average cooling rate CR1 in a temperature range of T2° C. to T1° C. is 50° C./second or less, and an average cooling rate CR2 in a temperature range of 100° C. or more and less than T2° C. is slower than CR1, when T2 is a temperature expressed in T1° C.-100° C.

* * * * *